United States Patent [19]

Stratton

[11] 4,052,743
[45] Oct. 4, 1977

[54] TRANSDUCER CARRIAGE TRANSPORT HAVING CYLINDRICAL BEARINGS AND A GROOVED GUIDE MEMBER

[75] Inventor: Boyd Lehman Stratton, Woodside, Calif.

[73] Assignee: Arvin Industries, Inc., Columbus, Ind.

[21] Appl. No.: 738,605

[22] Filed: Nov. 3, 1976

[51] Int. Cl.² ............................................. G11B 5/00
[52] U.S. Cl. ....................................... 360/99; 360/86
[58] Field of Search ................. 360/99, 86, 105, 106, 360/107, 133, 135; 346/137; 274/23 A

[56] References Cited

U.S. PATENT DOCUMENTS

| | | | |
|---|---|---|---|
| 3,539,716 | 11/1970 | Stratton et al. | 360/78 X |
| 3,749,827 | 7/1973 | Kinjo et al. | 360/106 |
| 3,770,905 | 11/1973 | Sperry | 360/106 |
| 3,814,441 | 6/1974 | Craggs | 360/105 X |

*Primary Examiner*—John H. Wolff
*Attorney, Agent, or Firm*—Biebel, French & Nauman

[57] ABSTRACT

A disc recorder includes a rotating disc and a transducer for coacting with the disc. A guide member has a guide surface extending transversely of the rotating disc and including a groove extending parallel to the disc. A carriage means for mounting the transducer is positioned generally parallel to and movable along the guide surface. A friction reducing pad is mounted on the carriage means and is movable along the guide surface. Friction reducing cylindrical bearing means are also mounted on the carriage means in spaced relation to the pad and are movable in the groove. A locating member having a locating surface is positioned substantially parallel to the guide surface. A loading means is mounted on the carriage means and engages the locating surface to bias the carriage means toward the guide surface such that the bearing pad engages the guide surface and the cylindrical bearing means engage the groove. Means are provided for moving the carriage means along the guide surface, the carriage means being confined to move only in a direction substantially parallel to the plane of the rotating disc.

5 Claims, 6 Drawing Figures

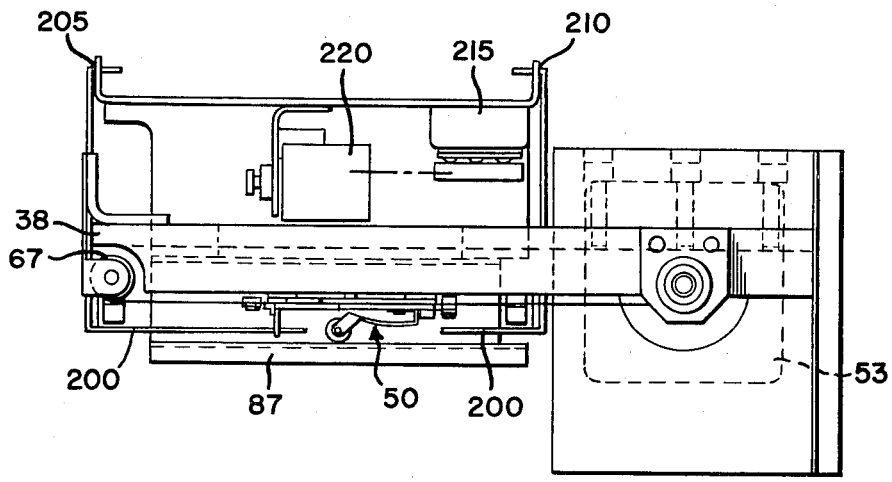
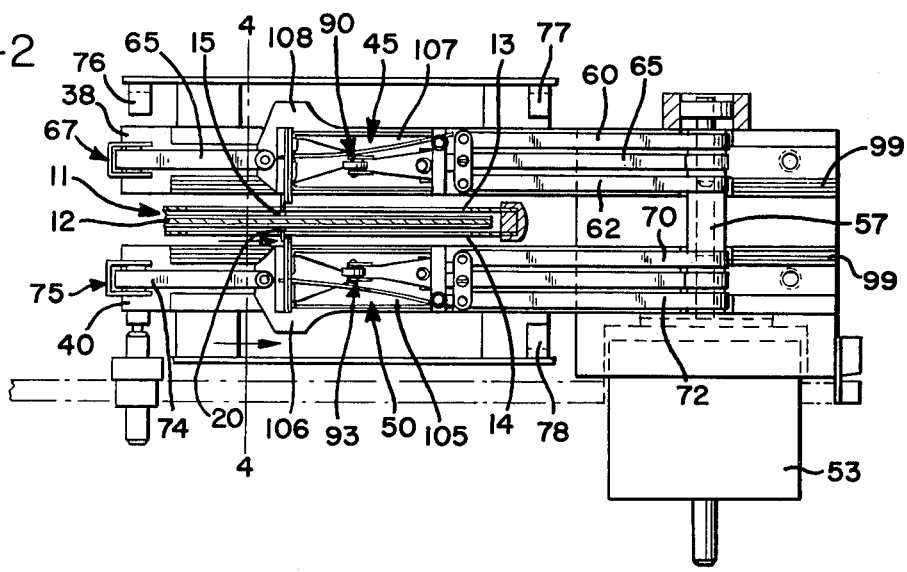
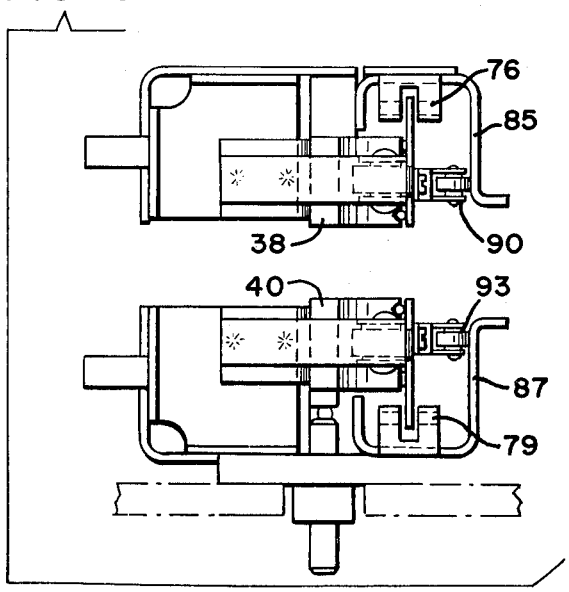
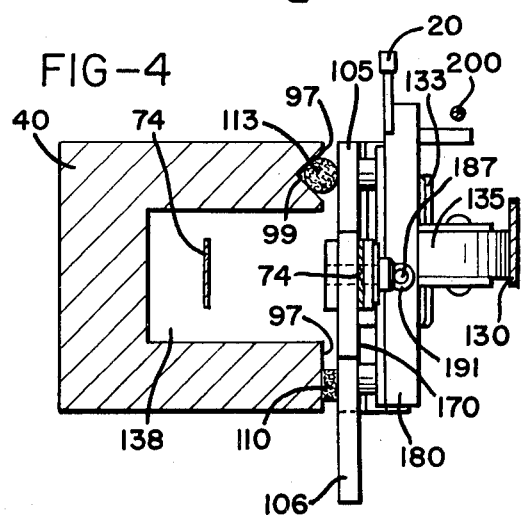

TRANSDUCER CARRIAGE TRANSPORT HAVING CYLINDRICAL BEARINGS AND A GROOVED GUIDE MEMBER

BACKGROUND OF THE INVENTION

The present invention relates to disc recorders and more specifically to recorders to which video information is recorded on a rapidly rotating magnetic disc. The disc used in such a recorder may be constructed of either rigid or flexible material. The recording disc is rapidly rotated and one or more transducer heads are positioned adjacent the recording surface. If desired, transducers may be provided for recording and playback on both sides of the recording disc.

Recording of video signals on a disc recorder may be accomplished in a number of ways. In one format, the signal is stored in a number of circular concentric recording tracks. The tranducer is moved only intermittently to the desired track for recording or playback. Generally one field of video information will be stored in each of the tracks. The disc will be rotated, therefore, at a rate equivalent to the field rate of the video signal. As can be readily appreciated, the motion of such transducer heads between tracks must be very rapid if all of the fields in a video signal are to be recorded, since 60 fields per second are present in the standard television signal in use in the United States.

One prior art transducer drive arrangement is shown in U.S. Pat. No. 3,539,716, issued Nov. 10, 1970, to Stratton et al. In the Stratton et al device, four transducer heads are positioned adjacent tracks defined on both sides of two rigid magnetic discs. These transducers are mounted on relatively heavy head carriages which encircle and are slidable on generally radially positioned arms. Each head carriage is attached to metal belts which engage a drive pulley and an idler pulley at opposite ends of the arm. The drive pulley may be rotated by a stepper motor to cause the head carriage to slide to predetermined positions along the arm.

The rigid disc type of recorder shown in the Stratton et al patent is not tolerant of transducer head position variations and, therefore, the head carriage must be positively and securely attached to the arm. The transducer carriage configuration utilized, while providing dimensional stability, requires a relatively long period of time to move between tracks due to its mass. The time required for a transducer to move between adjacent tracks is slightly less than one-fifth of the time interval corresponding to a field of video information. The Strattton et al device, however, compensates for the slow stepping mechanism by using four separate transducer heads which are sequentially actuated and transported.

A second type of prior art transducer transport is shown in U.S. Pat. No. 3,770,905 to Sperry, issued Nov. 6, 1973, and U.S. Pat. No. 3,814,441 to Craggs, issued June 4, 1974. These patents show transport mechanisms in which a radially disposed threaded rod is engaged by the transducer carriage. Rotation of the rod by a stepping motor causes the carriage to move to a desired position. Since the carriage mechanism and the threaded rod it engages are both moving in such a device, the inertia of the transport is significant and rapid stepping motion is difficult to obtain.

A second recording format for disc recorders is shown in U.S. Pat. No. 3,509,274, to Kihara, issued on Apr. 28, 1970. The transducer head is moved radially during disc rotation such that a continuous spiral track is defined. While such a recording format permits a slower transport mechanism to be utilized, this format is disadvantageous in that continuous high quality reproduction of a single video field, or series of fields, is not easily obtained.

SUMMARY OF THE INVENTION

A disc recorder includes a rotating disc and a transducer for coacting with the dic. A guide member has a guide surface which extends transversely of the disc and which surface includes a groove extending parallel to the disc. A carriage means for mounting the transducer is positioned generally parallel to and movable along the guide surface. A friction reducing bearing pad is mounted on the carriage means and slides along the guide surface as the carriage means is moved. Friction reducing cylindrical bearing means are also mounted on the carriage means in spaced relation to the bearing pad and are movable in the groove as the carriage means moves along the guide member. A locating member having a locating surface and a loading means mounted on the carriage means and engaging the locating surface bias the carriage means toward the guide surface. Means are provided to move the carriage means along the guide surface with the result that the carriage means is confined to move only in a direction which is substantially parallel to the rotating disc.

The rotating disc may be a flexible magnetic disc suitable for video recording. Preferably the guide surface will be perpendicular to the rotating disc and the transducer will move radially with respect to the disc as the carriage means is moved along the guide surface.

Accordingly, it is an object of the present invention to provide a disc recorder in which a transducer is mounted on a low mass carriage mechanism for rapid radial motion with respect to a rotating disc; and to provide such a recorder in which the transducer carriage moves along a grooved guide surface and is constrained in its direction of motion by the interaction of a cylindrical bearing means and the grooved guide surface.

Other objects and advantages of the present invention will be apparent from the following description, the accompanying drawings and the appended claims.

BRIEF DESCRIPTION OF THE DRAWINGS

FIG. 1 is a plan view of a recorder embodying the present invention with portions of the device removed;

FIG. 2 is a front view of the recorder of FIG. 1;

FIG. 3 is a side view of a portion of the recorder as seen looking left to right in FIG. 2;

FIG. 4 is an enlarged sectional view taken generally along line 4—4 in FIG. 2;

DETAILED DESCRIPTION OF THE INVENTION

Figure 5:
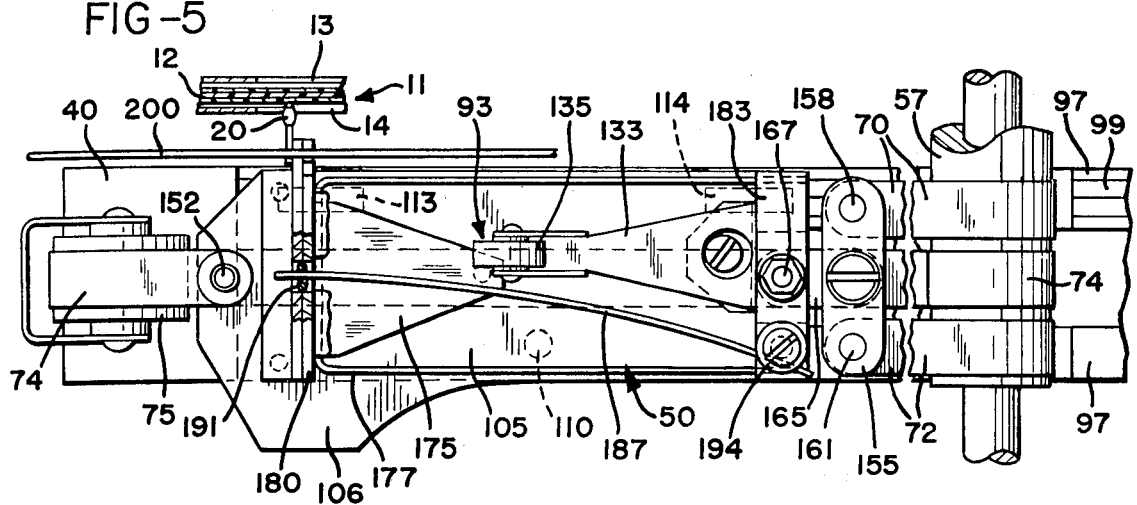
FIG. 5 is an enlarged front view showing the details of the transducer transport mechanism.

Referring now to FIGS. 1, 2 and 3, there is shown a portion of a disc recorder embodying the present invention. FIG. 1 is a plan view with portions of the device removed and broken away. FIG. 2 is a front view of the recorder with the disc cartridge in section. FIG. 3 is a view looking left to right in FIG. 2 with the transducer assemblies and the disc cartridge removed. While disc recorders for recording video signals may use either rigid magnetic discs or flexible discs, those recorders using flexible discs offer greater versatility while reducing the possibility of damage to the disc during operation of the recorder. As seen in FIG. 2, a cartridge 11 may be provided in which the flexible magnetic recording disc 12 is housed. Radially extending slots 13 and 14 in each side of the disc cartridge 11 permit access to the disc by transducers 15 and 20.

The record disc 12 extends between a pair of guide members 38 and 40, one above and one below the disc as shown in FIG. 2. The transducer assemblies 45 and 50 are moved along guide members 38 and 40, respectively, by stepping motor 53. A common drive pulley 57 is used to move both transducer assemblies with the result that they are stepped simultaneously to corresponding positions on opposite sides of the disc. Carriage belt means, including a first carriage belt 60, second carriage belt 62, and third carriage belt 65 move transducer assembly 45 when drive pulley 57 is rotated. Idler pulley 67 at the opposite end of the guide member 38 positions belt 65 as assembly 45 is moved. In like manner, belts 70, 72 and 74 and idler pulley 75 move transducer assembly 50 along guide member 40.

The extent of travel of transducer assemblies 45 and 50 is limited by photo sensors 76, 77, 78 and 79. Sensor 78 is used as a reset to detect when the transducers have been moved to an initial position. The sensors 76, 77 and 79 are provided to protect against over travel and are not actuated during normal recorder operation.

Running parallel to guide members 38 and 40 are locating members 85 and 87 (FIGS. 1 and 3). Loading means 90 and 93, mounted on transducer assemblies 45 and 50, interact with locating members 85 and 87 to assure the positional stability of the transducer assemblies, as is more fully explained below. The transports for the upper and lower transducers 19 and 20 are identical.

Each of the guide members 38 and 40 is generally U-shaped in cross section, as seen in FIG. 4. and provides a guide surface 97 extending transversely of the disc 35 and including a groove 99 extending parallel to the disc. FIG. 4, an enlarged sectional view of guide member 40, shows transducer carriage means 105 having tab 106 which interacts with the photosensors as explained above. Carriage means 107 likewise includes tab 108 for actuating the appropriate photosensors.

Friction reducing bearing pad 110 is attached to carriage means 105 and slides along guide surface 97. A pair of cylindrical bearing means 113 and 114 are mounted on the carriage member 105 in spaced relation to bearing pad 110 and are positioned to be slidable in groove 99. Loading means 93 includes leaf spring 133 and roller 135 which engage locating surface 130 and bias carriage means 105 toward guide surface 97. Groove 99 and bearing means 113 and 114 prevent relative vertical motion between carriage means 105 and guide member 40 as the transducer assembly is moved along the guide member.

Figure 6:
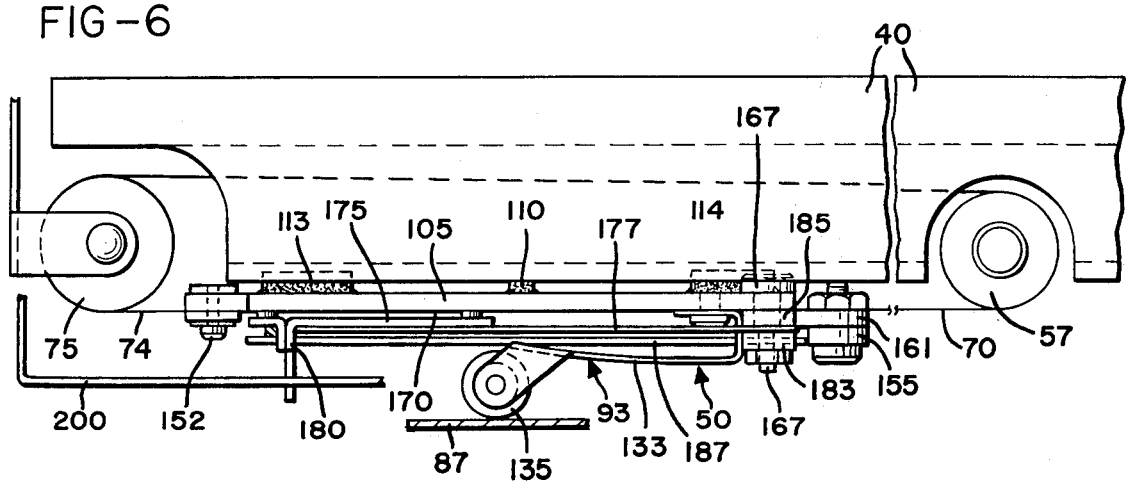
FIG. 6 is a plan view of the portion of the device shown in FIG. 5.

Referring now to FIGS. 5 and 6, the details of the transducer transport mechanism are shown. Guide member 40 extends between drive pulley 57 and idler pulley 75. Carriage means 105 includes friction reducing cylindrical bearing means 113 and 114 and a bearing pad 110. The bearing means and bearing pad allow the carriage means 105 to slide along guide member 40 on guide surface 97. As shown in FIG. 4, groove 99 engages the cylindrical bearing pads on the carriage means as a result of the interaction between loading means 93 and locating surface 130.

The carriage means 105 is moved along guide member 40 such that the transducer head 20 moves radially with respect to flexible recording disc 12. First and second carriage belts 70 and 72 are each attached at one end to carriage means 105 and at the other end to drive pulley 57. Belts 70 and 72 will be typically be pinned to drive pulley 57 and will be wrapped around the pulley a number of times. Also pinned to pulley 57 and wrapped around it is third carriage belt 74. Belt 74 is attached to carriage means 105 and extends in the opposite direction from the first and second belts 70 and 72. It should be noted that the third belt 74 is attached to drive pulley 57 intermediate second belts 70 and 72. As seen in FIG. 4, belt 74 extends from idler pulley 75 to drive pulley 57 through cavity 138.

Belt 74 is pivotally attached by bolt 152 to carriage means 105. On the opposite side of the carriage means, a "T"-shaped linkage arrangement is connected to belts 70 and 72. A first linkage means 155 is pivotally attached to belts 70 and 72 at pivot points 158 and 161. A second linkage means 165, attached to the first linkage means 155 intermediate the first and second carriage belts 70 and 72, is pivotally secured to carriage means 105 by bolt 167. The opposing forces applied to the carriage means 105 by the first, second, and third belts are therefore aligned. Second linkage means 165 is secured to carriage means 105 by bolt 167. Since the axes of the drive and idler pulleys are parallel, the friction between the belts and the pulleys is reduced and transducer movement may therefore be effectuated very rapidly. Additionally, since the carriage belts are not twisted, there is not twisting moment applied to the carriage means.

Transducer carriage 105 includes a mounting surface 170 which is substantially perpendicular to rotating disc 12 and substantially parallel to the direction of movement of carriage 105. A transducer holding plate 175 is positioned adjacent and parallel to mounting surface 170. Parallel motion linkage means 177 includes a generally U-shaped wire which attaches the transducer holding plate 175 to carriage 105. The parallel motion linkage means confines the motion of the transducer holding plate 175 in a plane parallel to the mounting surface 170 to motion which is substantially perpendicular to rotating disc 12. Parallel linkage means 177 is attached to holding plate 175 by potting the wire along the side of flange 180. The ends of the wire are rigidly secured between bar 183 and backing blocks 185. It should be understood that two separate parallel wires could be used as the parallel linkage means with the first ends of the wires attached to the mounting surface 170 and the other ends attached to holding plate 175.

Spring means, including wire spring arm 187, biases the transducer holding plate 175 against mounting surface 170 and also biases plate 175 toward rotating disc 12. Transducer means 20 is rigidly attached to holding plate 175 and thus moves toward disc 12 with a biasing force determined by spring 187. Spring 187 extends through a bearing in the form of a glass bead 191 set in flange 180. The other end of spring 187 is adjustably secured by mounting 194 to bar 183. Glass bead 191 prevents twisting forces from being applied to holding plate 175 by spring 187.

The transducer assembly of the present invention is particularly useful where rapid transducer movement is required due to its low inertial mass. Additionally, the force exerted on the recording disc by the transducer head may be easily and precisely adjusted.

Bale 200 is provided adjacent the upper edge of flange 180 and extends along the length of travel of transducer 20. A similar bale is provided for transducer assembly 45. As seen in FIG. 1 these blades extend to pivots 205 and 210 and are linked to rotary solenoid 215 and dashpot 220. When solenoid 215 is actuated, the bales contact the transducer holding plates and move heads 15 and 20 away from flexible disc 12. The motion of the recording heads is sufficient to allow disc 12 and cartridge 11 to be withdrawn from the recorder.

While the forms of apparatus herein described constitute preferred embodiments of the invention, it is to be understood that the invention is not limited to these precise forms of apparatus, and that changes may be made therein without departing from the scope of the invention.

What is claimed is:

1. A disc recorder comprising:
   a rotating disc,
   a transducer for coacting with said disc,
   a guide member having a guide surface extending transversely of said rotating disc and including a groove extending parallel to said disc,
   a carriage means for mounting the transducer, positioned generally parallel to and movable along said guide surface,
   a friction reducing bearing pad mounted on said carriage means and movable along said guide surface,
   friction reducing cylindrical bearing means mounted on said carriage means in spaced relation to said pad and movable in said groove,
   a locating member having a locating surface positioned substantially parallel to said guide surface,
   loading means mounted on said carriage means and engaging said locating surface to bias said carriage means toward said guide surface such that said bearing pad engages said guide surface and said cylindrical bearing means engages said groove, and
   means for moving said carriage means along said guide surface, said carriage means being confined to move only in a direction substantially parallel to the plane of said rotating disc.

2. The disc recorder of claim 1 in which said rotating disc is a flexible magnetic recording disc.

3. The disc recorder of claim 1 in which said guide surface is perpendicular to said rotating disc and in which said transducer is moved along a radius of said rotating disc as said carriage means is moved along said guide surface.

4. The disc recorder of claim 1 in which said means for moving said carriage means comprises:
   an idler pulley adjacent one end of said guide member,
   a drive pulley adjacent the other end of said guide member,
   drive belt means extending around said idler pulley, attached to said carriage means and attached to said drive pulley, and
   a stepping motor for rotating said drive pulley.

5. The disc recorder of claim 4 in which said guide member defines a cavity and in which a portion of said drive belt means extends through said cavity between said idler pulley and said drive pulley.